United States Patent
Kuivalainen et al.

(10) Patent No.: US 6,290,921 B1
(45) Date of Patent: Sep. 18, 2001

(54) METHOD AND APPARATUS FOR BINDING POLLUTANTS IN FLUE GAS

(75) Inventors: Reijo Kuivalainen, Kotka (FI); York Tsuo, Livingstone, NJ (US)

(73) Assignee: Foster Wheeler Enegeria Oy, Karhula (FI)

( * ) Notice: Subject to any disclaimer, the term of this patent is extended or adjusted under 35 U.S.C. 154(b) by 0 days.

(21) Appl. No.: 09/433,068

(22) Filed: Nov. 3, 1999

(51) Int. Cl.$^7$ .............................. B01D 53/50; B01D 53/68
(52) U.S. Cl. .................. 423/210; 423/215.5; 423/240 S; 423/244.07; 423/244.08
(58) Field of Search .................. 423/244.07, 244.08, 423/215.5, 210, 240 S

(56) References Cited

U.S. PATENT DOCUMENTS

| | | | |
|---|---|---|---|
| 3,411,864 | * 11/1968 | Pallinger | 423/210 |
| 4,185,080 | 1/1980 | Rechmeier | 423/242 |
| 4,279,873 | 7/1981 | Felsvang et al. | 423/242 |
| 4,309,393 | 1/1982 | Nguyen | 423/244 |
| 4,312,280 | 1/1982 | Shearer et al. | 110/347 |
| 4,590,049 | 5/1986 | Staudinger | 423/244 |
| 4,645,653 | * 2/1987 | Kimura | 423/235 |
| 5,464,597 | * 11/1995 | Tang | 423/210 |
| 5,795,548 | 8/1998 | Madden et al. | 422/171 |
| 5,814,288 | 9/1998 | Madden et al. | 423/244.01 |

FOREIGN PATENT DOCUMENTS

| | | | |
|---|---|---|---|
| 50-71575 | * 6/1975 | (JP) | 423/244.08 |
| 4-300625 A | * 10/1992 | (JP) | 423/244.08 |
| 5-154337 A | * 6/1993 | (JP) | 423/244.07 |
| WO 96/16722 | 6/1996 | (WO) . | |
| WO 97/06889 | 2/1997 | (WO) . | |

* cited by examiner

Primary Examiner—Steven P. Griffin
Assistant Examiner—Timothy C Vanoy
(74) Attorney, Agent, or Firm—Fitzpatrick, Cella, Harper & Scinto

(57) ABSTRACT

A method of binding pollutants, such as sulfur dioxide, hydrochloric acid and/or hydrofluoric acid, in flue gas in one or more combustion plants. The method includes the steps of (a) combusting fuel in a furnace of the one or more combustion plants, resulting in the production of flue gas containing pollutants, (b) introducing at least one of calcium oxide, limestone and dolomite, for forming calcium oxide, into the furnace for binding pollutants in the flue gas in the furnace, (c) causing flue gas to flow through a flue gas channel and a venturi contact reactor which are dimensioned so to provide a desired division of the moistened ash of step (e) into a portion entrained with the flue gas and another portion falling down into the retention tank provided in the flue gas channel, to a dust separator, which separates ash containing unreacted calcium oxide from the flue gas, (d) conducting a portion of the ash separated from the flue gas in step (c) to a moistening device, which mixes water amounting up to 50% of the weight of the ash into the ash, (e) conducting ash moistened in step (d) to the contact reactor, to mix the moistened ash into the flue gas, (f) causing a first portion of the ash mixed into the flue gas in step (e) to (g) causing a second portion of the ash mixed into the flue gas in step (e) to fall down into the retention tank, (h) hydrating at least a portion of the calcium oxide in the ash to form calcium hydroxide in the retention tank, (i) causing the ash to dry out during the hydrating step (h) and (j) recycling at least a portion of the ash from the retention tank to at least one of the one or more combustion plants.

22 Claims, 2 Drawing Sheets

METHOD AND APPARATUS FOR BINDING POLLUTANTS IN FLUE GAS

BACKGROUND OF THE INVENTION

1. Field of the Invention

The present invention relates to a method and an apparatus for binding pollutants in flue gas in a flue gas channel and furnace of one or more combustion plants, e.g., a fluidized bed boiler and/or a suspension-fired boiler.

One of the one or more combustion plants discussed above typically comprises a furnace, a flue gas channel connected to the furnace, a contact reactor provided in the flue gas channel, a dust separator provided in the flue gas channel after the contact reactor, and an ash recirculation conduit connecting the dust separator and the contact reactor, the recirculation conduit having a moistening device arranged therein. The method may include the following steps:

(a) maintaining reactions resulting in the production of flue gas containing pollutants in the furnace;
(b) introducing limestone or other calcium oxide forming material into the furnace for binding pollutants in the flue gas in the furnace;
(c) causing flue gas to flow through the flue gas channel to the dust separator, wherein ash containing unreacted calcium oxide is separated from the flue gas;
(d) conducting a portion of the ash separated from the flue gas to the moistening device, wherein water amounting up to 50% of the weight of the ash is mixed into the ash; and
(e) mixing the ash moistened in step (d) into the flue gas flowing in the contact reactor, whereby ash is entrained with the flue gas to the dust separator, thus binding pollutants in the flue gas.

2. Related Background

The combustion of sulfurous fuels in the furnace of a boiler generates sulfur dioxide ($SO_2$). The sulfur content of the flue gases emanating from the furnace can be reduced by wet, half-dry and dry desulfurization methods. By these methods, flue gases are allowed to react with a sulfur-binding compound which is in a liquid, wet (but drying during the process) or an initially dry form.

The sulfur content of flue gases can also be reduced by introducing directly to the furnace a sulfur-binding compound, e.g., calcium hydroxide ($Ca(OH)_2$), or a material, such as limestone or dolomite, which forms a sulfur-binding compound, e.g., calcium oxide (CaO). The last-mentioned method is efficient, especially in fluidized bed boilers, since the retention time of a sulfur-binding compound in the furnace can be quite long.

In a fluidized bed, calcium carbonate ($CaCO_3$) in limestone or dolomite calcines to form calcium oxide (CaO) which binds sulfur dioxide and forms calcium sulfate ($CaSO_4$) and calcium sulfite ($CaSO_3$). The problem in this process is a dense layer of calcium sulfate formed on the surface of the calcium oxide particles reacting with sulfur dioxide, which layer prevents the calcium oxide inside the particles from participating in the reaction. Therefore, in order to reach a sulfur binding level of over 90%, the mole ratio of calcium to sulfur in the material supplied to the bed, i.e., the Ca/S-ratio, has to be as high as 3–5 or even higher in some process conditions.

The calcination of lime requires energy, whereby the introduction of a large amount of lime into the furnace reduces the boiler efficiency. A high lime content in the fluidized bed also increases the amount of $NO_x$ emissions from the boiler. Further, there is a risk of deposits forming on the back pass, when a lot of lime is introduced into the furnace.

A high sorbent consumption adds to the costs, and the amount of solid waste produced by the plant is increased as well. Further, the lime in the ash has to be slaked (i.e., combined chemically with water) before storing or heaping, if the ash contains a significant amount of burnt lime.

The utilization rate of the sulfur-binding sorbent in a combustion plant can be improved by recovering unreacted calcium oxide in the bottom ash or fly ash and feeding it to the flue gas or back to the furnace after activation. The activation of the sorbent can be effected by extracting the calcium sulfate layer from the surface of the calcium oxide particles and slaking the lime, i.e., by hydrating the calcium oxide (CaO) so as to obtain porous calcium hydroxide ($Ca(OH)_2$).

U.S. Pat. No. 4,185,080 discloses a multi-stage method, in which calcium oxide is separated from the fluidized bed or fly ash, calcium sulfate is removed and calcium oxide is slaked by a stoichiometric quantity of water in a separate slaking apparatus producing dry, extremely fine-grained calcium hydroxide which is recycled to the combustion zone or to the gases emanating from the combustion zone.

U.S. Pat. No. 4,309,393 discloses another method based on the use of a separate hydrating apparatus, in which the unreacted calcium oxide of the bottom ash is hydrated by a large amount of water and supplied to the flue gases as a wet suspension.

U.S. Pat. No. 4,279,873 discloses a method, in which the flue gas is allowed to react in a spray drier with an aqueous suspension consisting of fly ash and slaked lime produced in a separate hydrating apparatus. The water content of the suspension is adjusted to obtain a temperature of the flue gas, which is 8–40° C. above the saturation temperature. It has been found that in these conditions, the sulfur oxides are bound most efficiently by calcium hydroxide. This patent also discloses the recycling of dry powder, collected from the bottom of the spray drier, to the suspension.

The published patent application WO 96/16722 discloses a method of removing sulfur dioxide from flue gas, in which fly ash is recycled, via a dust separator and a moistening device in the flue gas channel, together with fresh calcium oxide to be added during the recirculation. Water is mixed into the ash in the moistening device and the mixture is allowed to recirculate in the system as many times as is needed for the calcium oxide to have time to get hydrated completely. Therefore, no separate hydrating device is used in this method. When applying the method, the particles are typically in a moistened state only for 10–20 seconds during each cycle, whereby the number of cycles has to be high enough in order to accomplish sufficient hydration. Thus, the particle content of the flue gas is high, which causes erosion. Further, the size of the dust separator of the system has to be significantly increased.

U.S. Pat. No. 5,795,548 discloses an apparatus, which includes a spray drier and a particle separator upstream of the spray drier. Calcium oxide in ash obtained from the particle separator, from the bottom of the spray drier and from the last dust separator is slaked in a separate slaking apparatus. The produced material containing calcium hydroxide is then turned into a slurry, which is pumped to the spray drier and mixed in the flue gas by the sprayer.

SUMMARY OF THE INVENTION

It is an object of the present invention to provide a simple method and an apparatus for binding pollutants in flue gas in a flue gas channel and furnace of one or more combustion plants, in which the above prior art problems are minimized or overcome.

In particular, it is an object of the present invention to provide a simple and versatile method and apparatus for controlling the preparation and feed of sorbent for binding pollutants in flue gas.

It is another object of the present invention to provide a method and an apparatus, by which the utilization rate of the sorbent in a combustion plant can be improved in various process conditions.

It is a further object of the present invention to reduce $NO_x$ emissions from a boiler and to improve the boiler efficiency.

It is still a further object of the present invention to reduce the costs and reduce the risk of deposits forming on a back pass of a furnace.

It is still a further object of the present invention to reduce the amount of solid waste produced by a combustion plant and to simplify the waste management.

In order to achieve the above objects, and with respect to the method discussed on pages 1 and 2 of this disclosure, it is a characteristic of the method according to the present invention that a retention tank for ash is arranged below the contact reactor, and the method further includes the following steps:
(f) causing a portion of the ash moistened in step (d) and mixed into the flue gas to fall down to the retention tank for ash;
(g) hydrating at least a portion of the calcium oxide in the ash to form calcium hydroxide in the retention tank; and
(h) recycling at least a portion of the ash from the retention tank to at least one of the one or more combustion plants.

To solve the above prior art problems, characteristics of the apparatus according to the present invention are that a retention tank for ash is arranged below the contact reactor, into which a portion of the ash moistened in the moistening device and mixed into the flue gas falls and in which at least a portion of the calcium oxide contained in the ash is hydrated to form calcium hydroxide, and that a return conduit is connected to the retention tank for ash for recycling ash to at least one of the one or more combustion plants.

When applying the method, water amounting up to 50% of the weight of the ash, preferably 15–30%, is mixed into the ash in the moistening device. As the cooling of flue gas to a desired temperature requires a supply of a certain total quantity of water, the relatively high moisture content of the ash to be recirculated used in the method according to the present invention results in a relatively small amount of ash to be recirculated, whereby a normal dust separator can be used. The moistened ash can be fed to the contact reactor, as the moistening device is located in contact with the contact reactor so that ash is distributed as directly as possible from the moistening device into the contact reactor.

It is known to introduce slurry into flue gas in a spray drier, the spray nozzles of which turn the slurry into small drops that dry fast. In the method according to the present invention, the material fed to the flue gas is not wet slurry that can be pumped, but is moistened material. Spray nozzles are not used for the introduction of material into the flue gas channel. Rather, simple nozzles are used, through the openings of which, material is allowed to fall into the flue gas channel. Such large particles can easily be formed in the material used in the method according to the present invention that the flue gas is not able to carry them along, but they fall downwards into the flue gas channel and end up in the lowest part thereof, in the bottom of the contact reactor. According to the present invention, it has surprisingly emerged that the problem caused by the falling material can be beneficially utilized by arranging a retention tank in the lower part of the contact reactor, where the ash collected in the tank is hydrated and recirculated to the combustion plant.

As the hydration of the ash to be recirculated is, according to the present method, effected in the retention tank for ash below the contact reactor and not in the moistening device, the size of the moistening device or the recirculation volume of the ash need not be increased in order to reach a sufficient hydration time.

The volume of the moistening device has to be large enough for the material to have enough time to get well mixed into the water when passing through the moistening device. On the other hand, the volume of the moistening device is preferably as small as possible for the moistening to be effected quickly, and only a small part of the hydration process to take place in the moistening device. As the hydration process is mainly taking place in the retention tank for ash, the heat released in the hydration process further accelerates the hydration and, at the same time, dries the ash in the retention tank as efficiently as possible.

When applying the present invention, the ratio of the quantity of the mainly fine-grained ash entrained with the flue gas to the coarser ash falling into the retention tank can vary within a wide range. Preferably, the flue gas carries 30–95% of the moistened ash to the dust separator and 5–70% falls into the retention tank for ash.

In the apparatus according to the present invention, a venturi is preferably arranged in the contact reactor and the recirculation conduit is connected to the venturi. Thus, the venturi sets the flue gas in a strong turbulent motion mixing the ash efficiently into the flue gas. The contact reactor and venturi are dimensioned so as to provide a sufficient gas velocity for accomplishing a desired division of the moistened ash into a portion entrained with the flue gas and a portion falling down into the retention tank for ash.

The division of the moistened ash into a portion entrained with the flue gas and a portion falling down into the retention tank for ash can also be controlled by the gas stream of the contact reactor. This is brought about, e.g., by arranging elements in the lower part of the contact reactor, through which a desired quantity of gas, e.g., air, steam or flue gas, can be recirculated, when necessary.

With certain moistening device parameters, e.g., moisture values exceeding the limit depending on the ash quality, granules start emerging in the moistening device, which do not entrain with the flue gas in the contact reactor, but fall into the lower part thereof. Thus, the division of the moistened ash into a portion entrained with the flue gas and a portion falling down into the retention tank for ash also can be controlled by adjusting the moistening device parameters, such as the quantity of water to be supplied, the mixing speed or the mixing time.

According to a preferred embodiment of the present invention, bottom ash obtained directly from the furnace, or ash from the hot circulation separator of a circulating fluidized bed reactor also is fed to the moistening device, in addition to the fly ash from the dust separator. Particles only of a certain size can also be sieved from the ash for use.

The material obtained from the furnace or from the separator of the hot circulation of a circulating fluidized bed reactor is coarser and warmer than fly ash, whereby the temperature of the material to be provided to the contact reactor and the granular size distribution can be controlled by it. To enhance the portion of the ash obtained from the furnace or the separator increases the share of large particles and makes the ash temperature higher. At the same time, it increases the portion of the material falling into the retention tank for ash and makes the hydration process in the tank more efficient. Preferably, 5–60% of weight of the ash in the mixer is coarse material, the $D_{P50}$ of which is more than 150 µm, and 40–95% is fine material, the $D_{P50}$ of which is less than 100 µm.

As hydrated ash is conveyed from the retention tank for ash to further use, the moisture content thereof has to be typically less than 5%, whereby the ash can be easily conveyed. Preferably, the recirculation conduit can be connected to the contact reactor so high up that the surfaces of the falling ash particles have time to dry to some extent as they fall into the retention tank for ash. At the same time, the temperature of the flue gas drops and the relative and absolute humidity thereof increase. The heat released by the hydration process in the retention tank for ash dries the ash further.

The retention tank for ash can be arranged preferably in connection with the contact reactor so that ash-containing flue gas also from the direction of the furnace reaches the retention tank for ash. Hereby, also the ash and flue gas from the direction of the furnace dry the material in the retention tank for ash. The steam released in the retention tank and above it is mixed into the flue gas and conducted forward in the flue gas channel.

Preferably, no water is supplied to the retention tank for ash, but the water required for the hydration process is obtained with the moistened ash from the moistening device. The material in the retention tank for ash can, however, be dried by dry steam. At the same time, the steam, or alternatively, hot flue gas or air introduced into the tank, can keep the ash in motion and prevent plugging in the retention tank. The steam, flue gas or air coming through the tank can also intensify the gas stream in the contact reactor, whereby it also, for its part, affects the ratio of the ash quantity entrained with the flue gas to the ash quantity falling into the retention tank for ash.

The retention tank for ash has to be large enough for the retention time of the ash in the retention tank to be sufficient for the calcium hydroxide contained in the ash to have time to get hydrated almost completely. Thus, the retention tank for ash is preferably such that the retention time of the ash in the retention tank is 10–90 minutes, most preferably, about 10–20 minutes.

The calcium hydroxide formed in the retention tank for ash can be recirculated to the furnace and/or to the moistening device. The dry calcium hydroxide obtained from the retention tank is typically porous, whereby it absorbs sulfur dioxide efficiently in the furnace. The hydration also reduces the granular size of the ash, whereby the calcium hydroxide particles entering the contact reactor via the moistening device will, in all probability, be entrained with the flue gas and thus, participate in the binding of the sulfur dioxide in the flue gas. In some cases, e.g., if the moisture content of the material exiting the retention tank is relatively high, e.g., 5%, calcium oxide also can be recirculated directly to the contact reactor.

When using the method, the flue gas channel of the combustion plant often has, before the contact reactor, a falling convection pass, where an air preheater is arranged, and after the air preheater, a bottom hopper, where fly ash separated from the flue gas in the convection pass is collected. Hereby, the retention tank for ash can be arranged in the bottom of the contact reactor so that it forms the bottom hopper of the air preheater.

Ash removal from the system takes place mainly at the bottom of the furnace and from the dust separator to the storage silo. As coarse material also can accumulate in the bottom of the retention tank for ash, it also could be necessary to arrange the ash removal from the bottom of the retention tank for ash.

By using the present invention, it is possible under favorable conditions to bind 95% of the sulfur, when the Ca/S-ratio is less than 1.5, and 98%, when the Ca/S-ratio is less than 2. Thus, the invention reduces lime consumption, improves efficiency and reduces $NO_x$ emissions from the combustion plant as well as the amount of solid waste.

Further, when the amount of lime fed to the furnace is reduced, the risk of deposits forming on the back pass is smaller. When using the invention, neither moistened waste that is difficult to treat, nor waste containing large amounts of burnt lime that should be slaked before storing or heaping, is produced.

A special advantage in the technical solution according to the present invention, compared to the U.S. Pat. No. 5,795,548, is that the disclosed method of hydrating the calcium oxide in the ash by utilizing the heat released in the process produces dry calcium hydroxide that can easily be conveyed to various parts of the combustion plant. Further, according to the present invention, the moistened material can be introduced into the flue gas channel in quite a simple way, as the falling material being moistened is not problem, but an essential part of the operation of the apparatus.

When applying the invention, the material flows can be controlled within a wide range, whereby optimum lime consumption and binding of sulfur can be achieved in various process conditions.

BRIEF DESCRIPTION OF THE DRAWINGS

The invention is illustrated further in the following discussion with reference to the accompanying drawings, in which.

DESCRIPTION OF THE PREFERRED EMBODIMENTS

Figure 1:
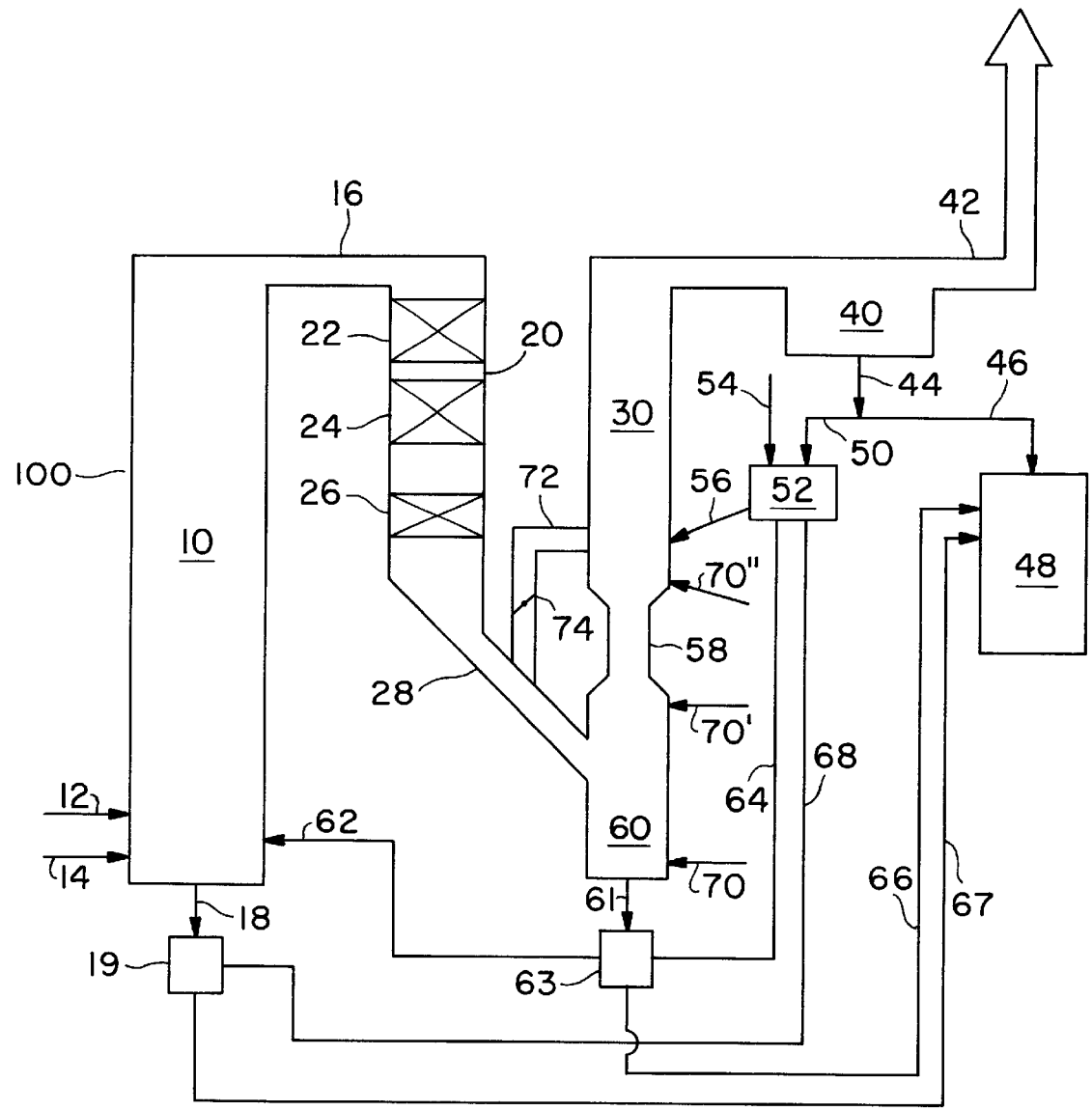
FIG. 1 is a schematic illustration of a combustion plant according to a first embodiment of the present invention.

As shown in FIG. 1, sulfurous fuel via a duct 12 and limestone or other calcium oxide forming material via a duct 14 are supplied to the furnace 10 of a combustion plant 100, e.g., a fluidized bed boiler or a suspension-fired boiler. The sulfur in the fuel is released and forms sulfur dioxide in the furnace. The calcium carbonate in the limestone fed to the furnace is calcined and forms calcium oxide, which binds sulfur dioxide to form calcium sulfate.

Calcium sulfate forms a dense layer on the surface of the calcium oxide particles, whereby unreacted calcium oxide is discharged from the furnace along with the flue gases through a discharge channel 16 for flue gases. Also, the bottom ash discharged from the bottom of the furnace via a duct 18 contains unreacted calcium oxide. Duct 61 conveys ash from the retention tank 60 to distributor 63 from which the ash may be distributed to furnace 10 through duct 62, moistening device 52 through duct 64 or silo 48 through duct 66.

The discharge channel 16 leads to a convection pass 20, which has heat exchange surfaces, e.g., a superheater 22, a preheater 24 for feed water and a preheater 26 for air. Downstream of the convection pass 20 is located a descending flue gas channel 28 and a rising contact reactor 30 in the flow direction of the flue gas. After the contact reactor 30 is a dust separator 40, which can be, e.g., an electrostatic precipitator or a bag filter.

The gas purified of particles is discharged from the dust separator 40 via a duct 42. The separated solid material, i.e., fly ash containing calcium oxide, is discharged via a duct 44 either along a duct 46 to a storage silo 48 or through a duct 50 to a moistening device 52. In the moistening device 52, water is introduced through a duct 54 and mixed into the solid material in an appropriate proportion. The mass of the water to be supplied is up to 50%, most preferably 15–30%, of the mass of the solid material.

The last part of the recirculation conduit from the dust separator 40 to the contact reactor 30 is a discharge conduit 56, through which the moistened material is transferred to the contact reactor 30 to be mixed into the rising flue gas stream. The contact reactor 30 is formed in a section of the flue gas channel 28, where the ash fed into the moistening device 52 reacts with the flue gas. The contact reactor 30 has to be long enough for the ash fed from the moistening device 52 and entrained with the flue gas to have time to dry out before the dust separator 40.

To promote the mixing of the flue gas and the material to be fed from the moistening device 52, a venturi 58 is arranged in the contact reactor 30, which venturi 58 sets the flue gas into a strong turbulent motion. The venturi 58 and the contact reactor 30 are dimensioned so that a desired portion, typically 30–95%, of the moistened material to be fed from the moistening device through the discharge conduit 56 is entrained with the flue gas to the dust separator 40. With a full load, the speed of the flue gas in the contact reactor 30 is typically 10–20 m/s.

The sulfur dioxide in the flue gas dissolves in the water inherent with ash particles. When conveyed to the dust separator 40, the particles dry out, whereby the temperature of the flue gas drops, e.g., to 60–140° C. At the same time, the sulfur in the dissolved sulfur dioxide forms solid calcium sulfate or calcium sulfite which can be removed from the flue gas by the dust separator 40.

When selecting the amount of material to be fed from the moistening device 52 to the contact reactor 30, one of the boundary conditions is the desired flue gas temperature. When the desired final temperature of the flue gas is, e.g., 110° C., it is necessary to supply a certain quantity of water, whereby the moisture content of the material determines the quantity of solid material. If the aim is to feed relatively dry material, the moisture content of which is, e.g., 10%, it is necessary to feed larger amounts of solid material than in the case of feeding material with a higher moisture content.

One of the advantages of the present invention is that it makes it possible to feed material with a relatively high moisture content by using simple equipment, whereby it is not necessary to feed large quantities of solid material to the contact reactor 30. When using the solution according to the present invention, the particle content of the flue gas in the contact reactor 30 is less than 0.5 kg/Nm$^3$, preferably less than 200 g/Nm$^3$.

The portion of the moistened material fed through the discharge conduit 56, typically 5–70%, that is not entrained with the flue gas, falls countercurrent into the retention tank for ash 60 arranged in the lower part of the contact reactor 30. The material dries out in the retention tank 60 and at least a portion of the calcium oxide contained in the ash is hydrated to form calcium hydroxide. Duct 61 conveys ash from the retention tank 60 to distributor 63 from which the ash may be distributed to furnace 10 through duct 62, moistening device 52 through duct 64 or silo 48 through duct 66.

As the moisture content and particle size distribution of the material entering the contact reactor 30 via the discharge conduit 56 affect the transfer of the material in the flue gas channel 16, the division of the moistened ash into a portion entrained with the flue gas and a portion falling down into the retention tank for ash 60 can be controlled by adjusting the parameters of the moistening device 52, such as the amount of water mixed into the ash, the speed of the mixer or the amount of ash kept in the apparatus and, at the same time, the passing-through time of the ash.

Another possibility is to control the division of the moistened ash into a portion entrained with the flue gas and a portion falling down into the retention tank for ash 60 by adjusting the gas stream of the contact reactor 30. This can be accomplished, e.g., by feeding air, flue gas or steam to the contact reactor 30 through one or several conduits 70, 70', 70" arranged upstream or downstream of the venturi.

A by-pass duct 72 can also be arranged in the flue gas channel 28, through which a portion of the flue gas can pass the venturi 58. The by-pass duct 72 is equipped with a control element 74, preferably a control valve, by which the flow rate of the flue gas passing the venturi 58 can be controlled. Thus, the control element 74 can be used to control the quantity of flue gas passing through the venturi 58 and, consequently, to regulate the division of the ash into a portion entrained with the flue gas and a portion falling down into the retention tank for ash 60.

The control element 74 can be preferably used so as to make a larger flue gas stream pass the venturi 58 with a higher load than with a lower load. A preferable way is to adjust the control element 74 so that the same quantity of flue gas from the furnace 10 passes through the venturi 58 with various loads, whereby the operation of the venturi 58 is not dependent on the load. Another preferable way is to adjust the control element 74 so that the division of ash into a portion entrained with the flue gas and a portion falling down into the retention tank for ash 60 depends in a predetermined way on the load.

The dry material containing calcium hydroxide can be recirculated from the retention tank 60 to the furnace 10 via a return conduit 62 and/or to the moistening device 52 via a return conduit 64. During the hydration process in the retention tank 60, at least a portion of the ash particles break down, whereby it is highly probable that the hydrated material coming again from the moistening device 52 to the contact reactor 30 will be entrained with the flue gas to the dust separator 40 and will thus participate in the binding of the sulfur. In some cases, it also can be advantageous to recirculate ash from the retention tank 60 directly to the contact reactor 30.

A substantial portion of the hydrated calcium particles is small and porous, and their calcium sulfate layer has vanished. Therefore, the material conveyed through the return conduit 62 to the furnace 10 makes the binding of sulfur more efficient in the furnace 10. If more material is collected in the retention tank 60 than it is possible to use in the binding of sulfur in the furnace 10 or the flue gas channel 28, the excess material can be discharged through a duct 66 to the storage silo 48.

Also, bottom ash from the furnace 10 containing unreacted calcium oxide can be conducted from duct 18 to the moistening device 52 through a duct 68. As the granular size of the bottom ash is larger than that of the fly ash, the temperature and granular size distribution of the material in the moistening device 52 can be regulated by controlling the amount of bottom ash conducted to the moistening device 52. Enhancing the portion of bottom ash increases the share of coarse ash and thus, the amount of material falling into the retention tank 60. At the same time, it raises the temperature of the material and accelerates the hydration process taking place in the retention tank 60. If the combustion plant 100 is a circulating fluidized bed boiler, ash from the particle separator of the boiler's hot circulation also can be conducted to the moistening device 52, instead of bottom ash. Preferably, 5–60% of weight of the ash in the moistening device 52 is coarse material, the $D_{P50}$ Of which is more than 150 μm, and 40–95% is fine material, the $D_{P50}$ of which is less than 100 μm.

The moistened material has to dry out before it is discharged from the retention tank 60 so as to facilitate the transfer of material from the retention tank 60 to desired spots. Therefore, it is possible to arrange the joining point of the discharge conduit 56 of the recirculation channel so high up in the contact reactor 30 that the surfaces of the particles have time to dry to some extent before the particles fall down into the retention tank 60. As the hydration process requires a significant amount of water, the particles are not, however, allowed to dry too much before entering the retention tank 60.

The material in the retention tank 60 also can be dried by diverting the ash and flue gas from the direction of the furnace 10 to hit the ash surface or above the ash surface in the retention tank 60. Naturally, the heat released in the hydration process dries the material in the retention tank 60 as well. In several cases, the heat released during the hydration process is sufficient to dry the material. For as large a portion of the hydrating heat as possible to be able to dry the material in the retention tank 60, the moistening device 52 has to be so small that no significant hydration has time to take place in the moistening device 52.

The moistened material in the retention tank 60 also can be dried by steam supplied through the duct 70. As the duct 70 is arranged in the lower part of the retention tank 60, it also can be used for keeping the material in motion and preventing the adhesion thereof.

The retention tank 60 is preferably sufficiently large that the retention time of the ash in the retention tank 60 is long enough for the calcium hydroxide contained in the ash to have time to get hydrated almost completely. The retention time of the ash in the retention tank 60 is preferably 10–90 minutes, most preferably about 10–20 minutes.

At the end of the convection pass 20 of the combustion plant 100, particularly as a last part of the descending portion thereof, is often arranged an air preheater 26 and a bottom hopper after the air preheater 26. In this case, the descending portion can lead to the same point where the rising part 30 of the flue gas channel starts, and the retention tank for ash 60 can at the same time be a bottom hopper for the air preheater 26.

Figure 2:
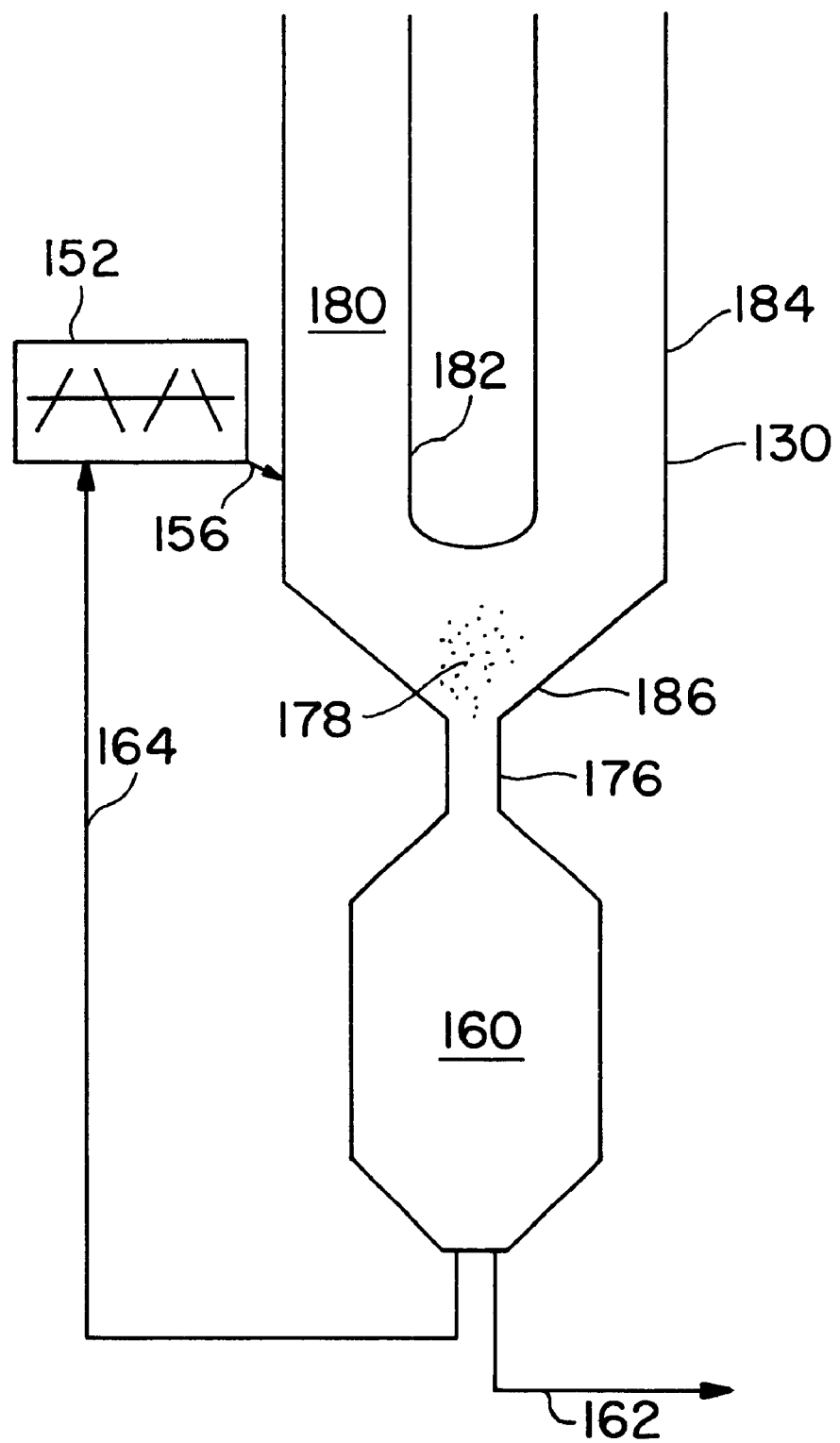
FIG. 2 is a schematic illustration of portions of a combustion plant according to a second embodiment of the present invention.

The second preferred embodiment of the invention illustrated by FIG. 2 is basically similar to the first preferred embodiment of FIG. 1. Those components in the embodiment of FIG. 2 that correspond substantially to components in FIG. 1 are illustrated by the same reference numeral as in FIG. 1, only preceded by a "1".

The solution in FIG. 2 in accordance with the second preferred embodiment of the invention differs from the solution according to the first preferred embodiment in FIG. 1 in that the discharge conduit 156 connecting the moistening device 152 and the contact reactor 130 is connected to the descending portion 182 of the flue gas channel 180. Thus, the contact reactor 130, where the binding of pollutants mainly takes place, is formed of the section between the joining point 186 of the discharge conduit 156 and the dust separator.

When using the embodiment according to FIG. 2, one portion of the ash fed from the moistening device 152 is entrained with the flue gas to the rising part 184 of the flue gas channel 180 and another portion, especially the largest particles of the ash, falls into the retention tank 160 connected to the joining point 186 of the descending portion 182 and the rising part 184.

In the retention tank 160, the calcium oxide in the ash is hydrated and thus, activated sorbent is conveyed back to the moistening device 152 through line 164 or to the furnace through line 162. The line 162 may also be connected to another combustion plant, e.g., a suspension-fired boiler, where it may lead to the furnace or any other suitable injection location.

In the embodiment according to FIG. 2, the retention tank 160 is not immediately in the lowest part of the contact reactor 130, but is below the lowest part of the contact reactor 130 so that a short channel 176 connects the lowest part of the contact reactor 130 and the retention tank 160. In this solution, a cloud 178, consisting of recirculated material from the moistening device 152 and light particles entrained with the flue gas from the furnace, is formed in the flue gas channel 180 above the retention tank. When the flue gas moving with great speed, e.g., 10–30 m/s, hits the particle cloud 178, a portion of the particles is entrained with the flue gas.

As the division of the material introduced into the flue gas channel 180 into a portion entrained with the flue gas and a portion falling into the retention tank 160 takes place at the joining point 186 of the descending portion 182 and the rising part 184 of the flue gas channel, there is no venturi in the rising part of the contact reactor 130. Therefore, the cross section thereof can be substantially constant.

While the invention has been herein described by way of example in connection with what is at present considered to be the most preferred embodiments, it is to be understood that the invention is not limited to the disclosed embodiments, but is intended to cover various combinations of their features and several other applications included within the scope of the invention as defined in the appended claims. The examples describe the binding of sulfur dioxide ($SO_2$), but it is apparent to those skilled in the art that the principles in accordance with the claims are also applicable to binding of other pollutants, e.g., hydrogen chloride (HCl) and hydrogen fluoride (HF), in the flue gas.

What is claimed is:

1. A method of binding pollutants in flue gas in one or more combustion plants, the method comprising the following steps:
    (a) combusting fuel in a furnace of the one or more combustion plants, resulting in the production of flue gas containing pollutants;
    (b) introducing at least one of calcium oxide, limestone and dolomite, into the furnace for binding pollutants in the flue gas in the furnace;
    (c) causing flue gas to flow through (i) a flue gas channel, (ii) a venturi contact reactor which is dimensioned so to provide a desired division of the moistened ash of step (e) into a portion entrained with the flue gas and another portion falling down into a retention tank provided in connection with the flue gas channel, and (iii) then through a dust separator, which separates ash containing unreacted calcium oxide from the flue gas;

(d) conducting a portion of the ash separated from the flue gas in step (c) to a moistening device, which mixes water in an amount of up to 50% of the weight of the ash into the ash;

(e) conducting ash moistened in step (d) to the contact reactor, to mix the moistened ash into the flue gas;

(f) causing a first portion of the ash mixed into the flue gas in step (e) to be entrained with the flue gas to the dust separator thus binding pollutants in the flue gas;

(g) causing a second portion of the ash mixed into the flue gas in step (e) to fall down into the retention tank for ash arranged below the contact reactor;

(h) hydrating at least a portion of the calcium oxide in the ash to form calcium hydroxide in the retention tank;

(i) causing the ash to dry out during the hydrating step (h); and (j) recycling at least a portion of the ash from the retention tank to at least one of the one or more combustion plants.

2. A method according to claim 1, wherein a flue gas channel is connected to the furnace of the one or more of the combustion plants and has a rising part and the contact reactor is arranged in the rising part of the flue gas channel, the method further comprising causing the ash falling down into the retention tank in step (g) to fall into the retention tank against the flow of the flue gas.

3. A method according to claim 1, wherein 30–95% of the ash moistened in step (d) is entrained with the flue gas to the dust separator, and 5–70% falls down into the retention tank for ash.

4. A method according to claim 1, further comprising conducting bottom ash from the furnace to the moistening device.

5. A method according to claim 1, wherein the furnace is a circulating fluidized bed reactor having a hot circulation separator, the method further comprising conducting ash separated by the hot circulation separator of the fluidized bed reactor to the moistening device.

6. A method according to claim 1, wherein 5–60% by weight of the material in the moistening device is coarse material, the $D_{P50}$ of which is more than 150 μm, and 40–95% by weight is fine material, the $D_{P50}$ of which is less than 100 μm.

7. A method according to claim 1, wherein a by-pass duct passing the venturi is connected to the flue gas channel, the by-pass duct having a flow regulator and the method further comprising controlling the division of the moistened ash into a portion entrained with the flue gas and a portion falling down into the retention tank for ash by adjusting the flow regulator.

8. A method according to claim 1, further comprising controlling the division of the moistened ash into a portion entrained with the flue gas and a portion falling down into the retention tank for ash by adjusting a flow rate of the gas stream through the contact reactor.

9. A method according to claim 1, further comprising controlling the division of the moistened ash into a portion entrained with the flue gas and a portion falling down into the retention tank for ash by adjusting the particle size distribution of the moistened ash by controlling at least one of: (i) the amount of water mixed into the ash; (ii) the speed of a mixer for mixing water into the ash and (iii) the passing-through time of the ash in the moistening device.

10. A method according to claim 1, wherein in step (h) the ash and flue gas entering the retention tank from the direction of the furnace dry the material in the retention tank.

11. A method according to claim 1, wherein the heat released in the hydration process in step (h) dries the material in the retention tank.

12. A method according to claim 1, further comprising introducing in step (h) at least one of dry steam, hot flue gas and air into the retention tank so as to dry the ash in the retention tank and maintain the mobility thereof.

13. A method according to claim 1, wherein the retention time of the ash in the retention tank for ash in step (h) is about 10–90 minutes.

14. A method according to claim 1, wherein the retention time of the ash in the retention tank for ash in step (h) is about 10–20 minutes.

15. A method according to claim 1, further comprising recycling, in step (j), calcium hydroxide to the furnace.

16. A method according to claim 1, further comprising recycling, in step (j), calcium hydroxide to the moistening device.

17. A method according to claim 1, further comprising recycling, in step (j), calcium hydroxide to the contact reactor.

18. A method according to claim 1, wherein the method is provided for binding pollutants in flue gas in two combustion plants, and further comprising recycling at least a portion of the ash in step (j) from the retention tank to the second combustion plant.

19. A method according to claim 18, wherein the first combustion plant is a fluidized bed boiler and the second combustion plant is a suspension-fired boiler.

20. A method according to claim 1, further comprising mixing in step (d) water in an amount of 15–30% of the weight of the ash, into the ash.

21. A method according to claim 1, wherein a flue gas recirculation conduit is provided, connecting the dust separator and the contact reactor, which is connected to or above the venturi.

22. A method according to claim 1, wherein said desired division results in between about 30% to about 95% of the moistened ash being entrained in the flue gas.

* * * * *

UNITED STATES PATENT AND TRADEMARK OFFICE
CERTIFICATE OF CORRECTION

PATENT NO. : 6,290,921 B1
DATED : September 18, 2001
INVENTOR(S) : Reijo Kuivalainen et al.

It is certified that error appears in the above-identified patent and that said Letters Patent is hereby corrected as shown below:

<u>Title page,</u>
Item [73], Assignee, "Foster Wheeler Enegeria Oy" should read -- Foster Wheeler Energia Oy --.

Signed and Sealed this

Tenth Day of September, 2002

*Attest:*

*Attesting Officer*

JAMES E. ROGAN
*Director of the United States Patent and Trademark Office*